United States Patent
Arneson

[11] 3,751,118
[45] Aug. 7, 1973

[54] CONTAMINANT DEFLECTION GROOVE FOR GAS BEARING

[76] Inventor: Harold E. G. Arneson, 2322 W. Lake of the Isles Blvs., Minneapolis, Minn. 55405

[22] Filed: July 2, 1971

[21] Appl. No.: 159,225

[52] U.S. Cl. .................................................. 308/5
[51] Int. Cl. .......................................... F16c 33/74
[58] Field of Search ........................... 308/9, 3.5, 5

[56] References Cited
UNITED STATES PATENTS
3,494,673   2/1970   Wilcox.................................. 308/9

Primary Examiner—Charles J. Myhre
Assistant Examiner—Frank Susko
Attorney—Reif and Gregory

[57] ABSTRACT

A contaminant particle deflection groove in connection with an externally pressurized gas bearing assembly comprising a sleeve and a shaft with the exhaust perimeter thereof being at the end of said sleeve and the improvement herein consisting of a groove in the face of said sleeve about said exhaust perimeter. The jet of gas exhausting from said exhaust perimeter of said sleeve along the exposed surface of said shaft entrains streams of ambient air and the contaminant particles carried by said air and both are deflected by means of said groove into a path parallel to said jet for dispersal prior to contact of said shaft by said particles of contaminants.

5 Claims, 6 Drawing Figures

INVENTOR.
HAROLD E.G. ARNESON

INVENTOR.
HAROLD E.G. ARNESON

CONTAMINANT DEFLECTION GROOVE FOR GAS BEARING

BACKGROUND AND SUMMARY OF THE INVENTION

The invention herein relates to means for preventing the deposit of dense atmospheric particles of contaminants onto an exposed bearing surface adjacent the exhaust perimeter of an externally pressurized bearing assembly.

For purpose of illustration, reference is had to an externally pressurized gas bearing assembly such as comprising a sleeve and a shaft with the exhaust perimeter being at the end of said sleeve. The jet escapes from said exhaust perimeter as a stream along the exposed bearing surface of the shaft and entrains the ambient air and the particles of contaminants therein. The dense particles of contaminants impinge upon said shaft and build up a deposit thereon adjacent the exhaust perimeter. Said particles include oily vapors which adhere to said shaft causing said deposit to become gummy.

The deposit upon said shaft builds up particularly when the shaft is at rest and the jet is exhausting. The deposit becomes sufficient to interfere with the movement of the shaft. Axial movement of the shaft after a deposit build-up thereon could result in a disturbance of the flow of the bearing film, it could result in an unwanted displacement of the shaft and it could freeze the shaft or score the bearing surface of the sleeve.

Said deposit builds up particularly upon the exposed bearing surface of the shaft along a line adjacent to the exhaust perimeter.

The improvement representing the invention as described and illustrated herein generally stated consists of forming a groove on the end face of a bearing member with said groove being parallel to the exhaust perimeter.

The exhaust jet entrains a stream of ambient air. The atmospheric pressure causes the entrained air to bear against and follow the end face of the bearing member having the groove therein. In passing into and through the groove, said air stream has its trajectory deflected and in passing out of said groove, said air stream assumes a path parallel to the jet and follows said jet outwardly of the shaft to be dispersed.

The particles of contaminants in the atmosphere becomes entrained with the air streams and attain the velocities of the air streams. The entrained air streams conform closely to the groove. The inertia of the dense particles of contaminants however prevent them from following exactly the paths of the air streams but they are deflected sufficiently so that they turn into a course parallel to that of the jet exhausting along the exposed bearing surface of the shaft. Thus contact of said particles with said shaft is prevented and said particles are carried away and dispersed by said jet.

It is an object of the invention herein to provide means to prevent the deposit of particles of contaminants upon the exposed bearing surface of a member of an externally pressurized gas bearing.

More particularly it is an object of the invention herein to provide means in connection with the exhaust jet of an externally pressurized gas bearing to deflect and disperse the ambient air and particles of contaminants therein entrained and thereby prevent said particles from contacting and becoming deposited upon exposed portions of bearing surface adjacent the exhaust perimeter of said jet.

With reference to the preceding object, is is also an object herein to provide structure to deflect particles of contaminants which structure would not require any extension to the bearing assembly beyond the exhaust perimeter.

These and other objects and advantages of the invention will be set forth in the following description made in connection with the accompanying drawings in which like reference characters refer to similar parts throughout the several views and in which.

DESCRIPTION OF PREFERRED EMBODIMENT

As a general description of the character of a bearing assembly to which the invention herein relates, an externally pressurized gas bearing assembly consists of two bearing members which are separated by a film of gas referred to as the bearing film and which is forced to flow between the opposed bearing surfaces separating them and forming therebetween the bearing space of said members. The clearance between the facing surfaces of the two members may be referred to as the film thickness or the bearing space. For practical purposes most gas bearings are designed to have a film thickness or bearing space on the order of 0.003 inches. Air is the medium commonly used in gas bearings and the term air will be used hereinafter in a generic sense relating to the use of a gas generally. The compressed air is supplied to the interior of the bearing space and escapes to the atmosphere from an exhaust perimeter at the edge of the less extensive of the two bearing members. The air from the bearing escapes to the atmosphere at said exhaust perimeter as a jet in the form of a sheet which is directed along the exposed portion or surface of the more extensive or other bearing member. Said bearing members are such as to have motion relative to each other and to have conjugate bearing surfaces of which either may be sometimes exposed and at other times may be covered by the other surface.

The invention herein is provided to prevent the deposit of particles of contaminants from the ambient atmosphere onto the exposed portion of the bearing surface adjacent the exhaust perimeter of the bearing.

The jet exhausting along the exposed surface of a bearing member, as above described, entrains a stream of ambient air which approaches the jet at a right angle along the face of the bearing member having the sleeve formed therein and makes a sharp turn at the point of meeting the exhaust jet to be drawn along with it. The ambient air by action of atmospheric pressure and gaseous viscosity is drawn along said face of said bearing member and with said jet. Dense particles of contaminants entrained in the ambient air stream fail to make the sharp turn and impinge on said exposed bearing surface adjacent said exhaust perimeter. Said particles comprise a mixture of dust and oil droplets which form a sticky deposit on said exposed bearing surface which deposit may build up to a point of making the bearing inoperative.

It will be understood that bearing surfaces may be flat, cylindrical or spherical, by way of example, and the exhaust perimeters may take various shapes. The exhaust perimeter is formed at the end of one of the bearing surfaces at or near to the edge of the bearing member of which it is a part. The bearing surface of the other member may extend for an indefinite distance beyond this exhaust perimeter such as to permit relative motion of the bearing members and this bearing surface is referred to as the exposed bearing surface.

Figure 1:
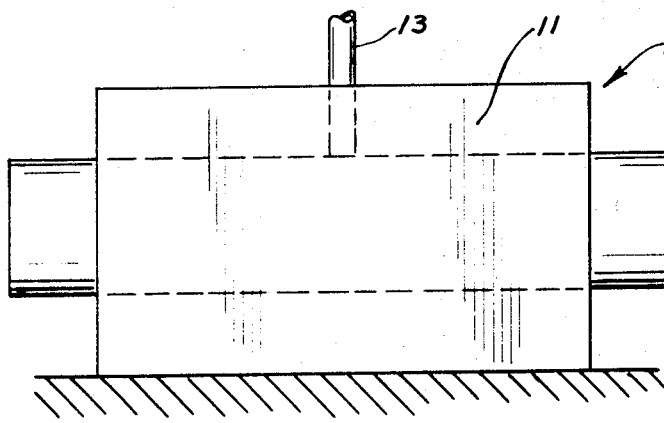
FIGS. 1 and 1A are views in side and end elevation of a conventional externally pressurized bearing assembly.
Figure 1A:
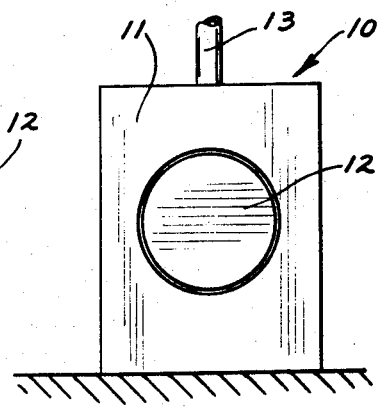
Figure 2:
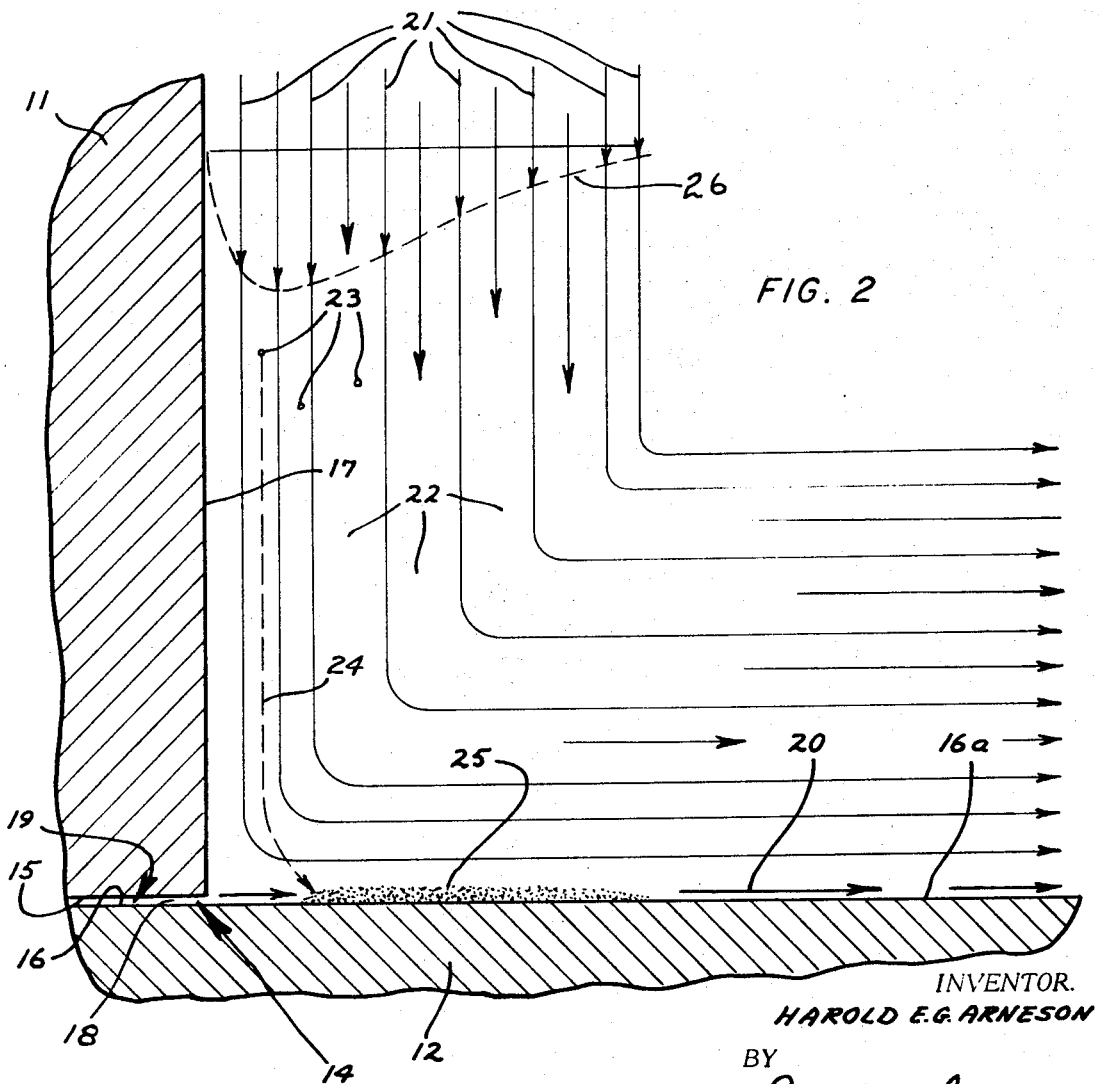
FIG. 2 is a fragmentary sectional view of the structure of FIG. 1 on an enlarged scale showing stream lines of entrained air.
Figure 3:
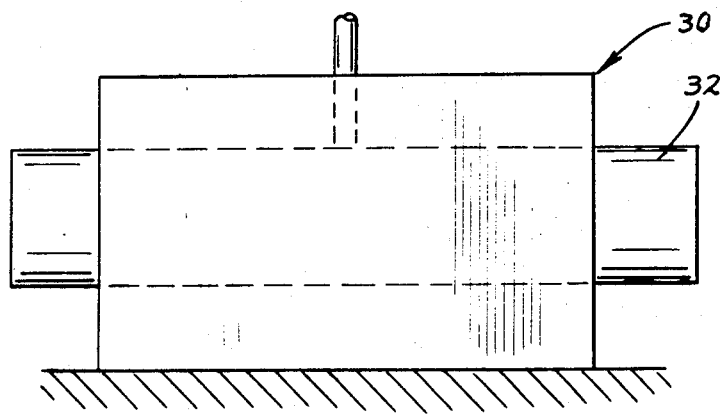
FIGS. 3 and 3A are views similar to FIGS. 1 and 1A modified to show the structure of the invention herein.
Figure 3A:
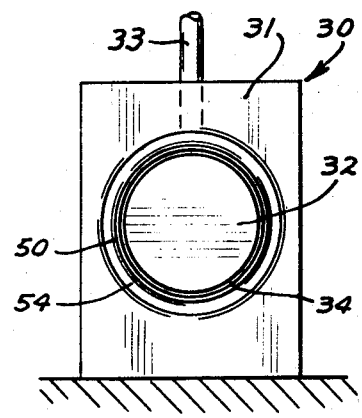

Referring to FIGS. 1 and 2 of the drawing and more particularly to FIG. 2, a fragmentary section view of an externally pressurized bearing assembly 10 is indicated which does not embody the invention herein. A description is given of the bearing assembly 10 to describe and illustrate the problem condition overcome by the invention herein. Said bearing assembly is shown comprising bearing members 11 and 12 having opposed bearing surfaces 15 and 16, an air supply inlet 13 and air exhaust perimeter 14 at the inner edge of the perpendicular facing portion 17 of the member 11. The bearing space 18 has a pressurized bearing film 19 therein and a jet 20 represents said bearing film escaping from said bearing space at the exhaust perimeter 14.

A plurality of stream lines 21 are shown indicating therebetween streams 22 of ambient air being drawn into and deflected to follow the jet 20. Particles of contaminants 23 denser than air are indicated as being entrained in ambient air streams and a typical trajectory is indicated by the broken line 24. Said ambient air is drawn into said jet in a pattern of streams which said stream lines indicate. The entrained air streams will extend outwardly of the bearing face 17 to the point where the ambient air is motionless. The area of deposit of said particles of contaminants on the exposed bearing surface portion 16 is indicated by the reference numeral 25. The deposit is closely adjacent the exhaust perimeter and extends over a distance therefrom as of one-sixteenth inches to one-tenth inches. The drawing is on an exaggerated scale to clearly show detail.

The jet 20 emerges from the bearing space at the exhaust perimeter 14 with considerable velocity and momentum and continues to move in the form of a sheet adjacent the exposed surface portion 16 of the bearing member 12.

Layers of ambient air adjacent said jet are drawn along with it by the action of gaseous viscosity forming a blanket of entrained air flowing over the exposed portion 16a of the bearing surface 16. Atmospheric pressure immediately forces air to replace the air drawn along with the jet and the air thus entrained is forced by said atmospheric pressure to move in along the perpendicular face 17 thus forming a region of laminar flow of replacement air having stream lines as indicated which are continuous with those of the outgoing air as drawn off by said jet.

The contaminant particles 23 entrained in the replacement streams of air attain very nearly the velocity of their respective air streams. Where the incoming air streams meet said jet they make a sharp bend. The contaminant particles entrained in said air streams will being more dense than air, follow a path of less curvature as indicated by the trajectory line 24 and thus impinge on the exposed bearing surface 16a forming a deposit 25 thereon. Said particles of contaminants will generally contain oil droplets and a stickey mass forms on said exposed bearing surface. Oil vapors will generally be present in the atmosphere wherein bearing assemblies and related machine tools are in use. The velocity profile 26 of the entrained air streams indicates the relative velocities being present in the layers of air adjacent said facing edge 17.

Figure 4:
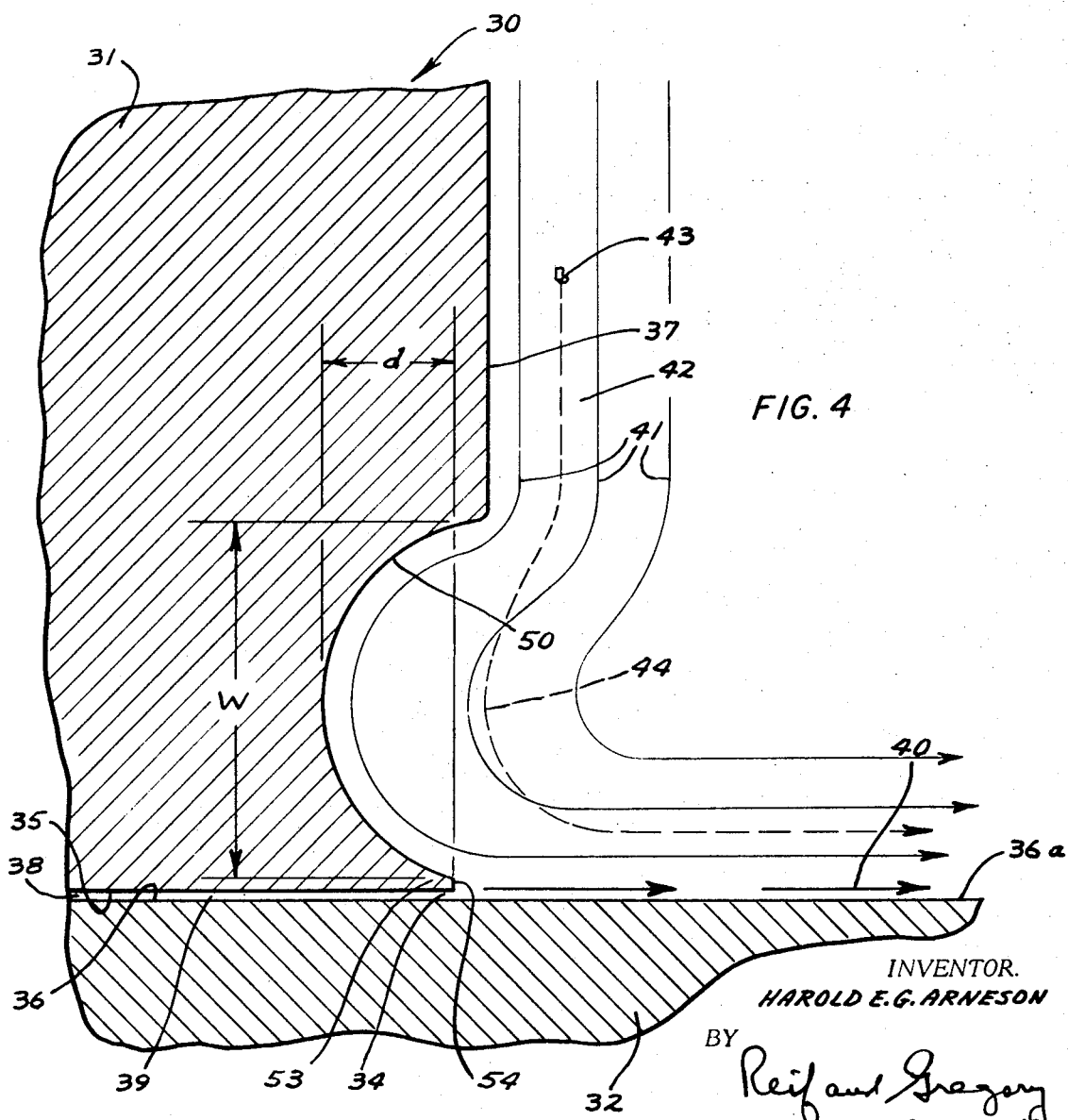
FIG. 4 is a fragmentary sectional view of the structure of FIG. 3 showing the invention herein on an enlarged scale.

Referring now to FIG. 4, a view similar to that of FIG. 2 is shown illustrating a like structure but one which embodies the invention herein. Said structure is indicated generally by the reference numeral 30 and comprises bearing members 31 and 32 having opposed bearing surfaces 35 and 36 having bearing space 38 therebetween, an air supply inlet 33 and an exhaust perimeter 34 at the inner edge of the facing portion 37 of said bearing member 31. A pressurized film 39 is present in said bearing space and escapes through the exhaust perimeter 34 to form a jet 40. Said bearing member 32 extends beyond the member 31 and thus exposes portion 36a of the bearing surface 36.

Streamlines 41 indicate streams 42 of the entrained ambient air. A dense particle of contaminant 43 is shown with the broken line 44 indicating its trajectory.

The invention herein consists in forming a groove 50 in the facing edge or portion 37 of the bearing member 31. Said groove will be parallel to the exhaust perimeter and will be annular in the bearing structure illustrated here which is shown having a circular exhaust perimeter.

With specific reference to the character of said groove, said groove is indicated as having a depth d and a width w which will be further described. A narrow ledge 53 having a width 54 spaces or separates said groove and said exhaust perimeter. Said ledge preferably is recessed behind the facing edge 37 as by an arbitrary small distance to reduce the vulnerability of said ledge to damage by accidental blows. Said groove is here indicated as being circular in cross-section but in practice it may take on other suitable cross sectional configurations.

Said groove 50 which will be referred to as a deflection groove is a relatively small groove closely spaced from the exhaust perimeter 34. The dimensions of the groove and its spacing from said exhaust perimeter relate or are proportional to the magnitude of the jet 40. The magnitude of the jet is the flow rate of escaping bearing film in cubic inches per second per inch of the exhaust perimeter. The groove will be of sufficient size and so spaced from the exhaust perimeter as to cause such a deflection of the trajectory or course of a dense particle of contaminant as to have said course change into a course which will be parallel to that of said jet whereby said contaminant is carried away from the bearing assembly without contacting said exposed surface portion 36a.

It has been learned from experience that to secure efficient performance and an effective prevention of the buildup of a deposit of contaminants on an exposed bearing surface that the width of the deflection groove should be at least a distance in inches equal to 0.02 times the magnitude of the jet in cubic inches per second per inch of exhaust perimeter. The depth of the groove should be at least 0.008 times said magnitude of said jet.

With respect to the spacing of said groove from the adjacent edge of the exhaust perimeter, said spacing, which is represented by the width 54 of said ledge 53, should be at least 0.010 inches or have a width measured in inches which will be at most 0.01 times the numerical value of the magnitude of said jet measured in cubic inches per second per inch of the exhaust perimeter, whichever is the greater.

Referring to FIG. 4, the depth of said deflection groove is measured from the plane of the outer edge of the end facing surface of the ledge 53 which preferably will be recessed with respect to the plane of the facing edge 37.

OPERATION

Referring first to FIG. 2, the build-up of the deposit of contaminants on the exposed bearing surface occurs closely adjacent the outer edge of the exhaust perimeter and more specifically it begins within a few thousandths of an inch of said exhaust perimeter and may extend 0.060 inches or more.

With reference to FIG. 4 showing the invention herein, the jet 40 emerges into the ambient air at the exhaust perimeter 34 and draws with it layers of ambient air 42 which layers will be presumed to extend outwardly to the point of motionless air. As air is drawn away from the facing edge 37 and adjacent thereto, replacement air will flow along said edge 37 until it reaches the groove 50. Atmospheric pressure deflects the streams of replacement air to curve said streams to conform to the transverse curvature of said groove 50.

The velocity profile shown in FIG. 2 applies here to indicate the various velocities of air stream flow according to distance from said edge 37. The maximum stream velocity is reached a short distance from the surface of said edge 37 and at greater distances the velocity falls off.

The air streams in conforming to said groove 50 are deflected in accordance with the curvature of the groove to flow outwardly therefrom parallel to said jet 40.

Particles of contaminants will move along with the streams of replacement air. The dense particle 43 is indicated as moving along with a stream of air where the velocity is the greatest. The trajectory of the particle 43 is indicated by the line 44. At the point where the replacement air streams conform to the groove 50, because of its greater inertia, said particle tends to follow a somewhat straighter path and does not conform fully to the curvature of said air streams. The inertia of the particle exerts and applies a reverse effective force tending to cause said particle to follow a straighter path than that of the air stream in which it was entrained.

Thus, the path of said particle is crossed by streams of air conforming to the transverse curvature of said groove and the particle in conforming to a lesser extent to the curvature of said groove than the adjacent air streams, in effect shifts into and becomes entrained into streams of air of lesser velocity and the friction of this air tends to slow the velocity of the particle.

The action of conforming sufficiently to the curvature of the groove 50 and the slowing of its velocity results in the trajectory of said particle bending or curving sufficiently to the extent of assuming a course parallel to that of said jet 40 whereby said particle is carried away in a stream of air running in a course parallel to that of said jet and is dispersed away from the bearing assembly. The trajectory of the particle thus is directed into a sweeping curve and follows a path to avoid engagement with the exposed bearing surface, 40.

Other dense particles at various distances from said facing edge portion 37 are influenced in a similar manner as above described.

The groove 50 should be designed sufficiently large to prevent the deposit of contaminants as above described but not so large that the structure of the bearing may be unduly weakened. The minimum groove dimensions necessary to prevent the deposits described will vary with the magnitude of the jet. A larger groove will be required for a bearing operated at a higher supply pressure than at a lower supply pressure. Also for a given supply pressure, the magnitude of the jet increases with the thickness of the clearance space between the adjacent or opposed bearing surface.

The groove should be designed at least large enough to accomodate the maximum jet expected under operating conditions.

The structure herein disclosed and described has been reduced to a commercial product and has proved very successful under operating conditions.

It will of course be understood that various changes may be made in form, details arrangements and proportions of the parts without departing from the scope of the invention herein which, generally stated, consists in an apparatus capable of carrying out the objects above set forth, in the parts and combinations of parts disclosed and defined in the appended claims.

What is claimed is:

1. A contaminant deflection groove in connection with an externally pressurized bearing assembly having in combination,
    a pair of bearing members respectively having bearing surfaces in parallel opposed relationship to each other and having a bearing space therebetween,
    means injecting gas under pressure within said bearing space forming a bearing film,
    an exhaust perimeter at the edge of one of said bearing members for the escape of said bearing film to form a jet,
    the surface of the other of said bearing members extending beyond said exhaust perimeter forming an exposed bearing surface, and
    a groove formed in the end facing surface of said one of said bearing members closely spaced from said exhaust perimeter, the wall of said groove deflects the entrained air stream and the contaminants therein into a path parallel to said exposed bearing surface.

2. The structure set forth in claim 1, wherein said groove is spaced from said exhaust perimeter at least 0.010 inches or 0.01 times the numerical value of the magnitude of said jet expressed in cubic inches per second per inch of exhaust perimeter, whichever is the greater.

3. The structure set forth in claim 1, wherein the width of said groove is at least 0.02 times the magnitude of said jet in cubic inches per second per inch of exhaust perimeter, and
    the depth of said groove is at least 0.008 times said magnitude of said jet.

4. The structure set forth in claim 1, wherein said exhaust perimeter is recessed inwardly of the plane of said end facing surface of said one bearing member.

5. The structure set forth in claim 1, wherein said groove is spaced from said exhaust perimeter 0.01 times the numerical value of the magnitude of said jet expressed in cubic inches per second per inch of exhaust perimeter.

* * * * *